J. Haseltine,
Horseshoe.

No. 2,543. Reissued Apr. 9, 1867.

Inventor.
Jno Haseltine
By Munn & Co
Attys

Witnesses:
Wm Frewin
Theo Tusch

United States Patent Office.

SAMUEL ADLAM, JR., OF CHARLESTOWN, MASSACHUSETTS, ASSIGNEE BY MESNE ASSIGNMENTS OF JOHN HASELTINE.

*Letters Patent No.* 49,028, *dated July* 25, 1865; *reissue No.* 2,543, *dated April* 9, 1867.

IMPROVED SHOE-PAD FOR HORSES' FEET.

The Schedule referred to in these Letters Patent and making part of the same.

TO ALL WHOM IT MAY CONCERN:

Be it known that JOHN HASELTINE, of Warren, in the county of Grafton, and State of New Hampshire, has invented an improved Rubber or Elastic Horse-Shoe Cushion and Foot Protector, of which the following, taken in connection with the drawings which accompany and form part of this specification, is a description sufficient to enable those skilled in the art to practise it.

The invention consists of a cushion made of rubber or rubber compound, and vulcanized to a shape to conform to the general form of the foot of the horse, and the metal shoe applied thereto. the object of the invention being not only to interpose a soft yielding bed or cushion between the shoe and the hoof, but to have this cushion so formed as to fit the surface of the foot to which it is applied, and in such manner as to entirely prevent the foot from "balling" with snow. The drawings represent a rubber cushion embodying the invention—

Figure 1:
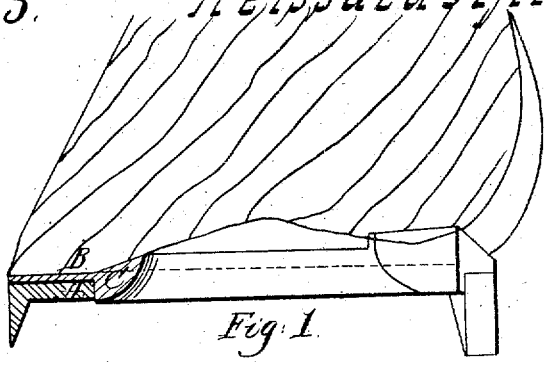
Figure 2:
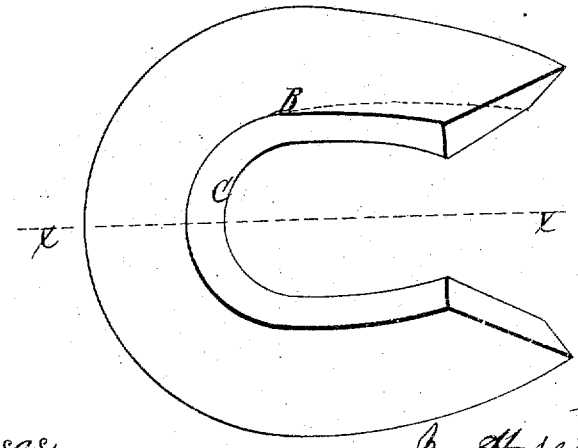

Figure 1 showing a section of the same on the line *x x* of fig. 2, and showing the position the cushion occupies relatively to the shoe and the hoof when applied.

Figure 2 shows a plan of the cushion.

B denotes the rubber or rubber compound, moulded or vulcanized to the shape of the foot, and having formed integraly with it a roll or ridge, C, against a shoulder of which the inner edge of the shoe A fits, when the shoe and cushion are applied, while the upper surface of the roll extends up and fits closely against the under surface of the hoof, and thus effectually prevents any admission of snow between the hoof and the shoe, and the "balling" of the foot consequent upon the adhesion of snow thereto It will be obvious that this roll piece may extend inwards to any distance from the part B, and may even be so made as to form a web entirely across the cushion, but the general form shown in the drawings is considered preferable, as this answers perfectly when applied both as a cushion to yield slightly as the shoe strikes the pavement, and as a preventive to the lodgment of snow between the shoe and the bottom of the hoof.

What is claimed as a new article of manufacture, is—

A cushion or protector for horses' feet, made of rubber or rubber compound, and to fit the foot, substantially as set forth.

SAM'L ADLAM, JR.

Witnesses:

F. GOULD,

L. H. LATIMER.